United States Patent

Honold

[15] 3,683,374

[45] Aug. 8, 1972

[54] RADAR ANTENNA ARRANGEMENT
[72] Inventor: Peter Honold, Munich, Germany
[73] Assignee: Siemens Aktiengesellschaft, Berlin and Munich, Germany
[22] Filed: Aug. 10, 1970
[21] Appl. No.: 62,387

[30] Foreign Application Priority Data

Aug. 13, 1969 Germany..........P 19 41 268.1

[52] U.S. Cl. ..........................343/6.5 R, 343/100 SA
[51] Int. Cl................................................G01s 9/56
[58] Field of Search ....................................343/6.5 R

[56] References Cited

UNITED STATES PATENTS 2,966,675  12/1960  Smoll......................343/6.5 R

*Primary Examiner*—T. H. Tubbesing
*Attorney*—Hill, Sherman, Meroni, Gross & Simpson

[57] ABSTRACT

A radar antenna utilizing primarily antenna having a pencil-shaped radiation characteristic and two secondary radar antennas which supplement the primary antenna and are disposed adjacent the periphery of the primary antenna, the secondary antenna each having a fan-shaped radiation characteristic, the secondary antennas being of such shape and so arranged as to effect an intersection of the fan-shaped beams thereof to form a joint overlapping range, one of the secondary antennas being utilized for transmission of interrogation signals and the other secondary antenna being utilized for the reception of reply signals whereby the transmission-reception of such signals is effected in such overlapping range. One of the secondary antennas may be disposed adjacent the upper or lower edge of the primary antenna and the other secondary antenna disposed adjacent a side edge of the primary antenna, and each of the secondary antennas may be provided with a radiator for side-lobe suppression.

10 Claims, 4 Drawing Figures

INVENTOR
PETER HONOLD

RADAR ANTENNA ARRANGEMENT

BACKGROUND OF THE INVENTION

The invention relates to a radar antenna arrangement utilizing a primary radar antenna having a pencil-shaped radiation characteristic and two additional secondary radar antennas which are provided as a supplement to the primary radar antenna. The secondary antennas, which may be of elongated configuration, having a radiation characteristic producing a fan-shaped beam, may be mounted adjacent the periphery of the primary radar antenna in such a way that the fan beams intersect one another to provide a joint overlapping range thereat.

The integration of a secondary antenna arrangement with a primary antenna arrangement creates, among other things, the problem of synchronizing the antenna-azimuth angle of the primary radar antenna with that of the secondary radar antenna. Heretofore, the antenna for the secondary all-around search were separately mounted with respect to the primary radar antenna and suitably rotated synchronously with the latter by means of a servo motor or the like, or such secondary antenna was suitably mounted with the primary radar antenna for direct rotation therewith about the axis of the primary antenna.

A common arrangement, for example, comprises a line array, for secondary radar, at the upper, lower or one of the side edges of the primary radar antenna. Two such secondary radar antennas may be employed, each having a fan shaped radiation characteristic. The combining of the target signal information involved with such fan beams is effected by a switching of the fan beams (lobe switching) of the fan beams or by the utilization of multi-channel receivers employing a mono-pulse operation between consecutive sensing periods.

SUMMARY OF THE INVENTION

In accordance with the present invention a considerable reduction in cost may be effected by providing two secondary radar antennas, one of which is utilized as the transmitting antenna for the radiation of the interrogation signals, and the other secondary radar antenna is utilized as a receiving antenna for the reply signals. By effecting suitable disposition of the secondary antennas the fan beams thereof may be disposed to intersect one another whereby a complete transmission and reception of signals occurs only in the overlapping range of the two fan beams whereby the combined transmission-reception characteristic has a pencil shape.

It is of particular importance in this arrangement that there is provided the possibility of effecting a suppression of the unavoidable minor lobes of the antenna characteristics of the secondary antennas by suitable special measures (SLS-side-lobe suppression). Two possible methods are available in this connection for the interrogation direction (ISLS), namely the double-pulse or the triple-pulse methods, the basic principles of both methods of minor-lobe suppression being similar in that a reference or control pulse is included in the interrogation pulse group which is transmitted by particular radiator, such control pulse being utilized in the receiving device for differentiating whether the inquiry comes from a side lobe or from the main radiation lobe of the transmitting system.

In a further advantageous development of the invention, each of the additional secondary radar antennas is provided with a radiator for effecting side-lobe suppression, suitable means being provided for the side-lobe-interrogation suppression on the interrogation path of the secondary radar antenna employed as a transmitting antenna (ISLS-interrogation path side-lobe suppression). Similarly, suitable means is provided for the side-lobe suppression on the reply path for the secondary radar antenna which forms the receiving antenna (RSLS-reply path-side lobe suppression). In place of the SLS radiator, other SLS antenna arrangements may be used for the secondary radar antennas, such as a sum and difference antenna. In each case the ambiguities or uncertainties resulting from the side lobes are effectively prevented.

In a particularly simple embodiment of the invention, one secondary radar antenna may be so designed that it produces a horizontal fan beam and the other secondary radar antenna produces a vertical fan beam. If the primary antenna, having a pencil-shaped radiation characteristic is provided with a more or less square configuration, one of the additional secondary radar antennas preferably may be arranged, in the form of a line array, adjacent the upper or lower edge of the primary radar antenna, while the other secondary radar antenna, likewise in the form of a line array, may be disposed at one of the two lateral side edges of the primary radar antenna.

A particularly advantageous embodiment of the antenna arrangement according to the invention may be produced by effecting an operation of the primary radar antenna and/or the secondary antennas with electronic beam shifting (phased array).

BRIEF DESCRIPTION OF THE DRAWINGS

In the drawings wherein like reference characteristics indicate like or corresponding parts.

DETAILED DESCRIPTION OF THE INVENTION

Figure 1:
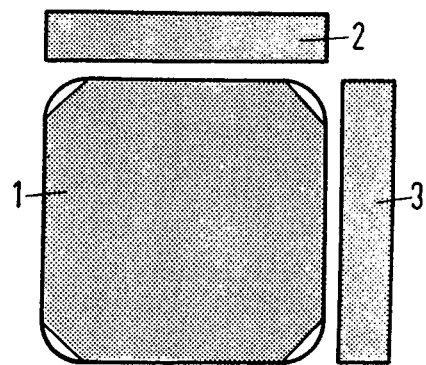
FIG. 1 illustrates schematically an antenna arrangement according to the invention, employing a primary antenna and a pair of secondary antennas.
Figure 2:
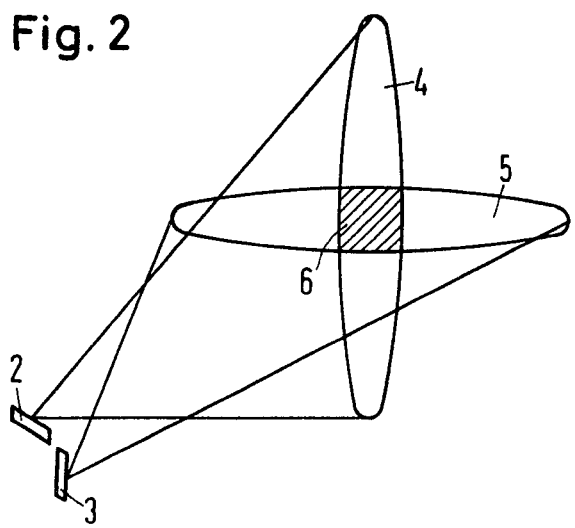
FIG. 2 diagrammatically illustrates the coaction of the beam patterns of the respective secondary antennas.

Referring to the drawings, and more particularly to FIGS. 1 and 2, the reference numeral 1 designates a primary antenna, adjacent the upper and one side edge of which are disposed respective secondary antennas 2 and 3, the horizontally extending secondary antenna 2 and vertically extending antenna 3 being employed, for example, for friend-foe-identification (IFF).

The two secondary antennas 2 and 3 are constructed to provide fan-shaped beam characteristics as indicated by the reference numerals 4 and 5, one of which extends horizontally and the other vertically. The horizontal beam 5 may, for example, be utilized for transmission whereby the interrogation signals are transmitted thereby while the reply signals may be received over the vertical fan beam 4. Cooperable transmission-reception thus occurs only in the overlapping range 6 of the two fan beams 4 and 5, to produce a pencil-beam operational characteristic.

Figure 3:
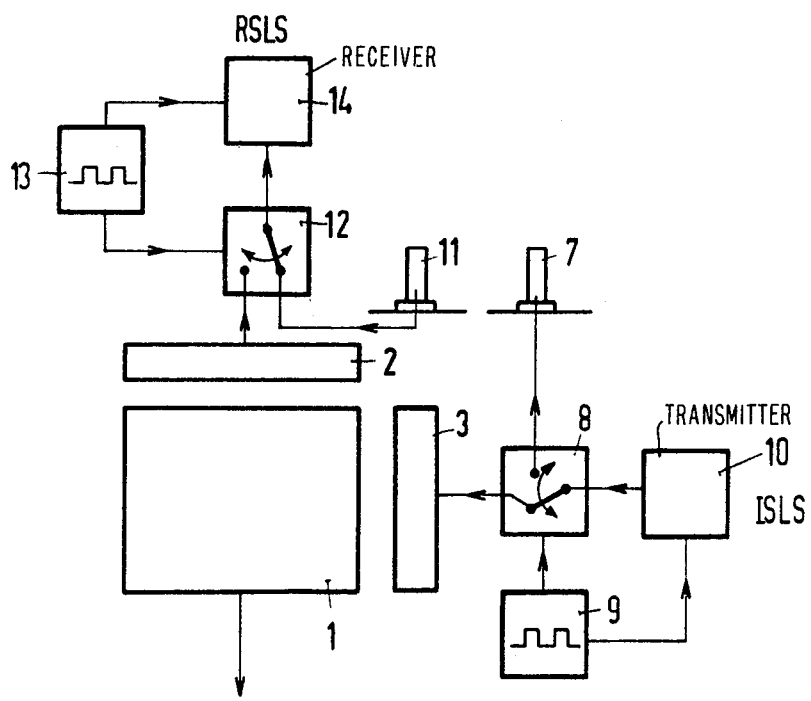
FIG. 3 is a diagrammatical figure illustrating an antenna system embodying an antenna arrangement such as illustrated in FIG. 1.

FIG. 3 illustrates an antenna arrangement incorporating a general construction such as illustrated in FIG. 1 with operative components, of known construction, illustrated in block form. In this arrangement associated with the primary antenna 1 are two secondary antennas 2 and 3 which are respectively mounted adjacent the top and one side edge of the antenna 1, with the secondary antenna 3 being utilized as a transmitting antenna and provided with a radiator 7 for side-lobe suppression, for example a monopole which is effective as an omnidirectional antenna. The two antennas 3 and 7 are cooperable and operate on the interrogation path with side-lobe suppression (ISLS-interrogation path side-lobe suppression).

To effect such operation, an electronic switch 8 is provided which, in response to gate pulses from a gate-pulse source 9, operatively connects a transmitter 10 to either the antenna 3 or the radiator 7, the transmitter 10 being provided with suitable means for the side-lobe interrogation suppression.

In like manner, the secondary antenna 2, utilized as a receiving antenna, is provided with a radiator 11 for side-lobe suppression, for example a monopole similar to the radiator 7 and which likewise is effective as an omnidirectional antenna. The antenna 2 and radiator 11 are cooperable to effect a side-lobe suppression on the reply or receiving path (RSLS-reply path side-lobe suppression). Consequently, an electronic switch 12 is provided which, dependent on the presence of gate pulses from a gate pulse source 13 is operable to connect the receiver 14 to either the antenna 2 or the radiator 11. The receiver 14 likewise is provided with suitable evaluation means for side-lobe suppression on the reply or receiving path, whereby the amplitudes of the pulses received by the antennas 2 and 11 are compared.

Figure 4:
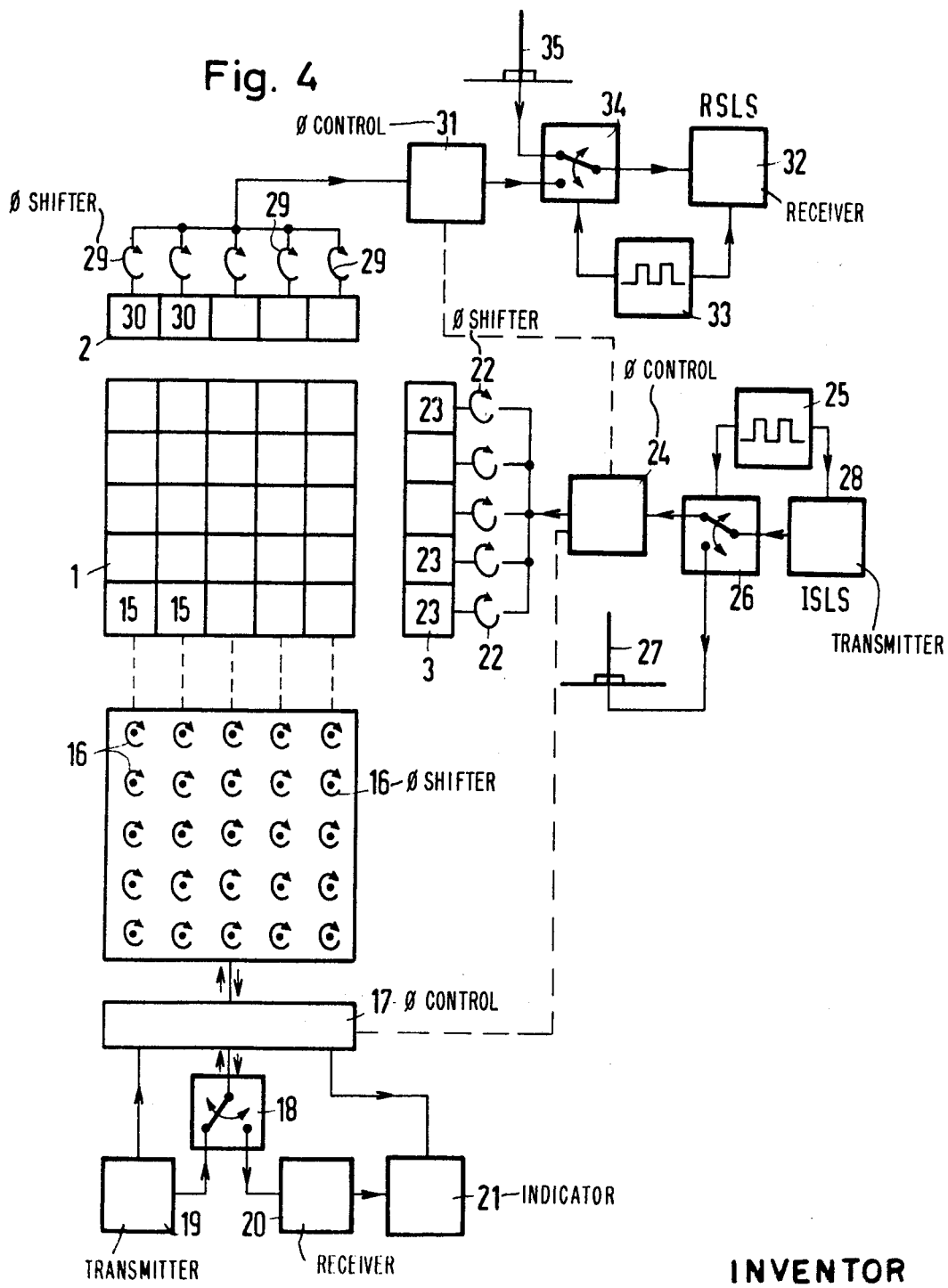
FIG. 4 diagrammatically illustrates an antenna system, similar to that illustrated in FIG. 3 employing radiators in the form of phased arrays.

FIG. 4 illustrates the application of the present invention to antenna structures utilizing individual phase controlled radiators. In this construction the square primary antenna 1 consists of a plurality of individual phase controlled radiators 15, the phase shifters 16 of which are arranged analagous to the individual radiators 15 and are correspondingly associated therewith. The phase shifters 16 are controlled by a phase-control device 17, of known design, in accordance with the angle of traverse of the pencil beam radiated thereby. Cooperable therewith is a transmission-reception switch 18, i.e., a duplexer, which is operative in time dependence to provide a direct connection of a transmitter 19 or receiver 20 to the antenna structure. An indication device 21 for the pencil shaped rotatable beam is synchronized with the phase-control device 17.

The secondary antenna 3, utilized for transmission, likewise comprises a number of individual radiators 23 which are controlled by phase shifters 22, operation being in turn controlled by a phase-control device 24. A gate pulse source 25 is operatively connected for control of an electronic switch 26 which is adapted to alternately connect the secondary radar antenna 3 or a polydirectional radiator 27 to a transmitter 28 whereby a side-lobe suppression on the interrogation path (ISLS) can be effected.

In like manner the secondary radar antenna 2, utilized for receiving, comprises a number of individual radiators 30 which are controlled by phase shifters 29, such control being effected by a phase-control device 31. The receiver 32 and polydirectional radiator 35 are alternately connected to the antenna 2 by means of an electronic switch 34 which is controlled by a gate pulse source 33 whereby a side-lobe suppression on the reply path (RSLS) can be achieved by suitable comparison of the signal levels received by the antennas 2 and 35. As illustrated in FIG. 4 by broken lines, the phase-control devices 17, 24 and 31 advantageously are suitably coupled to provide a synchronous beam shifting.

Having thus described my invention it will be obvious to those skilled in the art from the disclosure herein given that various immaterial modifications may be made in the same without departing from the spirit of my invention.

I claim as my invention:

1. In a radar antenna arrangement utilizing a primary radar antenna and two secondary radar antennas which are supplemental to the primary antenna and disposed adjacent the periphery of the primary antenna, the combination of the primary antenna having a pencil-shaped radiation characteristic and the secondary antennas each having a fan-shaped radiation characteristic, said secondary antennas being arranged to effect an intersection of radiation paths to form a joint overlapping range for the two fan beams thereof, one of said secondary antennas comprising a transmitting antenna for the radiation of interrogation signals, and the other secondary antenna comprising a receiving antenna for the reply signals, whereby cooperable transmission-reception is effected in said overlapping range.

2. A radar antenna arrangement according to claim 1, wherein the primary radar antenna has a square configuration and a pencil-shaped radiation characteristic, one of the additional secondary radar antennas, in the form of a line array, being mounted adjacent a horizontal peripheral edge of the primary radar antenna, and the other secondary radar antenna, in the form of a line array, being mounted adjacent a side edge of the primary radar antenna.

3. A radar antenna arrangement according to claim 1, wherein one of the secondary antennas is constructed to produce a horizontal fan beam, and the other secondary radar antenna is constructed to produce a vertical fan beam.

4. A radar arrangement according to claim 3, wherein the primary radar antenna has a square configuration and is constructed to provide a pencil-shaped radiation characteristic with electronic beam shifting (phased array).

5. A radar antenna arrangement according to claim 3, wherein at least one of said secondary antennas is constructed for electronic beam shifting (phased array).

6. A radar antenna arrangement according to claim 3, wherein both of said secondary antennas are constructed for electronic beam shifting (phased array), one of said secondary antennas being mounted adjacent a horizontal edge of the primary antenna, and the other of said secondary antennas being mounted adjacent a vertical edge of the primary antenna.

7. A radar antenna arrangement according to claim 1, wherein each secondary radar antenna is provided with a radiator for the suppression of side lobes (SLS- side-lobe suppression), radiator means for the side-lobe interrogation suppression on the interrogation path, cooperable with the associated secondary radar antenna employed for transmission, means for alternating transmission over said secondary transmitting antenna and said radiator means (ISLS-interrogation path side-lobe suppression), radiator means for the side-lobe suppression on the reply path cooperable with the secondary antenna employed for receiving, and means for alternating reception over said secondary receiving antenna and said last-mentioned radiator means (RSLS- reply path side-lobe suppression).

8. A radar antenna arrangement according to claim 7, wherein the primary radar antenna has a square configuration and a pencil-shaped radiation characteristic, one of the additional secondary radar antennas, in the form of a line array, being mounted adjacent a horizontal peripheral edge of the primary radar antenna, and the other secondary radar antenna, in the form of a line array, being mounted adjacent a side edge of the primary radar antenna.

9. A radar antenna arrangement according to claim 7, wherein one of the secondary radar antennas is constructed to produce a horizontal fan beam, and the other secondary radar antenna is constructed to produce a vertical fan beam.

10. A radar antenna arrangement according to claim 9, wherein the primary radar antenna has a square configuration and is constructed to provide a pencil-shaped radiation characteristic with electronic beam shifting (phased ray), both of said secondary antennas being constructed for electronic beam shifting (phased ray), one of said secondary antennas being mounted adjacent a horizontal edge of the primary antenna, and the other of said secondary antennas being mounted adjacent a vertical edge of the primary antenna.

* * * * *